(12) United States Patent
Erden et al.

(10) Patent No.: US 7,349,167 B2
(45) Date of Patent: Mar. 25, 2008

(54) UTILIZING TRACK IDENTIFICATION FIELDS FOR TIMING RECOVERY

(75) Inventors: Mehmet Fatih Erden, Pittsburgh, PA (US); Richard Lyle Keizer, Minnetonka, MN (US); Timothy Francis Ellis, Tonka Bay, MN (US); Alexei Hiram Sacks, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 288 days.

(21) Appl. No.: 11/190,324

(22) Filed: Jul. 27, 2005

(65) Prior Publication Data

US 2007/0025003 A1    Feb. 1, 2007

(51) Int. Cl.
G11B 5/02 (2006.01)
G11B 5/09 (2006.01)
(52) U.S. Cl. .................. 360/29; 360/51; 360/77.08
(58) Field of Classification Search ..................... None
See application file for complete search history.

(56) References Cited

U.S. PATENT DOCUMENTS

| 4,424,543 A | * | 1/1984 | Lewis et al. ............... 360/135 |
| 4,823,212 A | | 4/1989 | Knowles et al. |
| 5,600,499 A | | 2/1997 | Acosta et al. |
| 5,617,536 A | | 4/1997 | Freitas et al. |
| 5,737,142 A | | 4/1998 | Zook |
| 5,757,567 A | | 5/1998 | Hetzler et al. |
| 5,757,568 A | | 5/1998 | Greenberg et al. |
| 5,949,358 A | | 9/1999 | Volz et al. |
| 6,441,981 B1 | | 8/2002 | Cloke et al. |
| 6,462,898 B2 | | 10/2002 | Blaum et al. |
| 6,515,812 B1 | * | 2/2003 | Bergmans et al. ............ 360/48 |
| 2003/0147166 A1 | * | 8/2003 | Hetzler et al. ................ 360/51 |

FOREIGN PATENT DOCUMENTS

EP    0522750 B1    5/1999

* cited by examiner

*Primary Examiner*—Andrea Wellington
*Assistant Examiner*—Dan I Davidson
(74) *Attorney, Agent, or Firm*—Robert P. Lenart, Esq.; Pietragallo Gordon Alfano Bosick & Raspanti, LLP

(57) ABSTRACT

An apparatus comprises a data storage medium having a plurality of servo sectors and a plurality of data sectors, wherein each of the servo sectors includes a phase locked loop field and a track identification field, a controller for controlling the position of a recording head with respect to the data storage medium, and a servo demodulator for recovering timing information from both the phase locked loop field and the track identification field, and for producing a timing estimate. The method performed by the apparatus is also included.

18 Claims, 13 Drawing Sheets

FIG. 11

UTILIZING TRACK IDENTIFICATION FIELDS FOR TIMING RECOVERY

FIELD OF THE INVENTION

This invention relates to data storage devices, and more particularly to methods and apparatus for controlling timing recovery in such devices.

BACKGROUND OF THE INVENTION

Disc drives are data storage devices used to store and retrieve digital user data in a fast and efficient manner. A typical disc drive stores such data on one or more magnetic recording discs which are rotated at a constant high speed. An actuator moves one or more data transducing heads to access data stored in tracks defined on the disc surfaces.

With the continued demand for disc drives that provide ever higher data storage capacities and transfer rate performance levels at lower costs, designers continue to provide successive generations of products with ever higher areal data storage densities. It will be recognized that for a given area on the recording surface of a disc, more data can be stored by increasing the number of bits per linear distance along the tracks (e.g., bits per inch, BPI) as well as by increasing the number of the tracks on the disc (e.g., tracks per inch, TPI).

Servo data are written to the discs during disc drive manufacturing to define the tracks and to provide head position information for a closed loop servo control circuit. The servo control circuit uses the servo data during both seeking and track following operations.

A well-known sector servo architecture places servo information in sectors that alternate with data sectors in a circumferential direction on a disc. Each servo sector includes a Phase Locked Loop (PLL) field (also referred to as an Adaptive Gain Controller (AGC) field), a Servo Address Mark (SAM) or Servo Index Mark (SIM) field, a track identification (Track ID) field, a servo burst field containing servo burst patterns, and a Repeatable Run Out (RRO) field. Information contained in the servo sectors is processed by a servo demodulator and used to control the position of a recording head with respect to the disc.

Before processing the servo bursts, a servo demodulator first adjusts its parameters, then it detects the Servo Address Mark (SAM) or the Servo Index Mark (SIM), and Track IDs associated with each track, to make sure that the magnetic head is in the vicinity of a particular data track center. Afterwards, it processes the servo bursts to fine tune the location of the recording head and force it to the center of the data track. Finally, it corrects any possible non-zero bias in the system resulting from the effect of Repeatable Run Out (RRO) during read and write operations.

At the beginning of a servo sector, the servo demodulator adjusts its parameters and recovers the possible timing offsets in the system to remove any phase and frequency offsets. For this purpose, servo demodulators contain timing recovery circuitry based on either synchronous or asynchronous sampling of analog signals produced in response to the written PLL field on the disc. In the case of synchronous sampling, this circuitry recovers the correct sampling instants for a sampler that is used to sample the analog signal. In the case of asynchronous sampling this circuitry recovers timing offsets from samples of the analog signal where the sampling instants are generated by a free running clock. After the servo demodulator processes information from the PLL field, the recovered timing offset is fixed for the entire servo sector, and the other fields within the sector are processed with this recovered sampling information. However, as the storage areal densities increase, the effects of timing errors, channel noise, distortions, and nonlinearities also increase, and the length of the PLL field in the servo format may be too short for an acceptable timing recovery performance. Thus longer PLL fields may be needed for an acceptable timing recovery performance. However the use of a longer PLL field reduces the servo format efficiency.

Thus there is a need to increase servo performance without increasing the PLL field length.

SUMMARY OF THE INVENTION

This invention provides an apparatus comprising a data storage medium having a plurality of servo sectors and a plurality of data sectors, wherein each of the servo sectors includes a phase locked loop field and a track identification field, a controller for controlling the position of a recording head with respect to the data storage medium, and a servo demodulator for recovering timing information from both the phase locked loop field and the track identification field, and for producing a timing estimate.

The invention also provides a method comprising: reading servo data from a plurality of servo sectors on a data storage medium, wherein each of the servo sectors includes a phase locked loop field and a track identification field; recovering timing information from both the phase locked loop field and the track identification field; and producing a timing estimate for controlling the position of a recording head with respect to the data storage medium.

BRIEF DESCRIPTION OF THE DRAWINGS

Figures 8, 9, 10, 11:
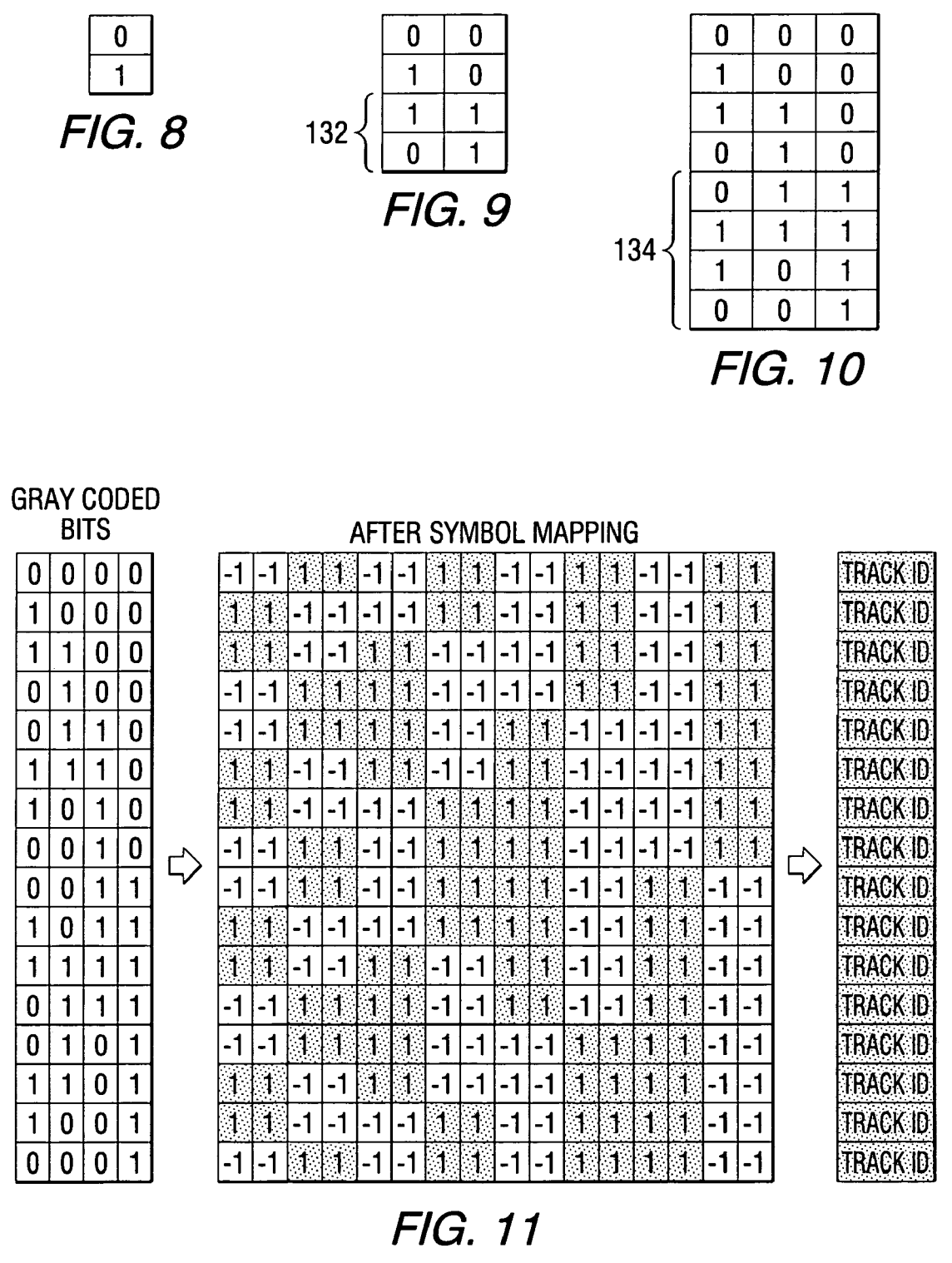

FIG. 8 is a schematic representation of a 1-bit Track ID field.

FIG. 9 is a schematic representation of a 2-bit Track ID field.

FIG. 10 is a schematic representation of a 3-bit Track ID field.

FIG. 11 is a schematic representation of a 4-bit Track ID field, before and after the symbol mapping.

DETAILED DESCRIPTION OF THE INVENTION

Figure 1:
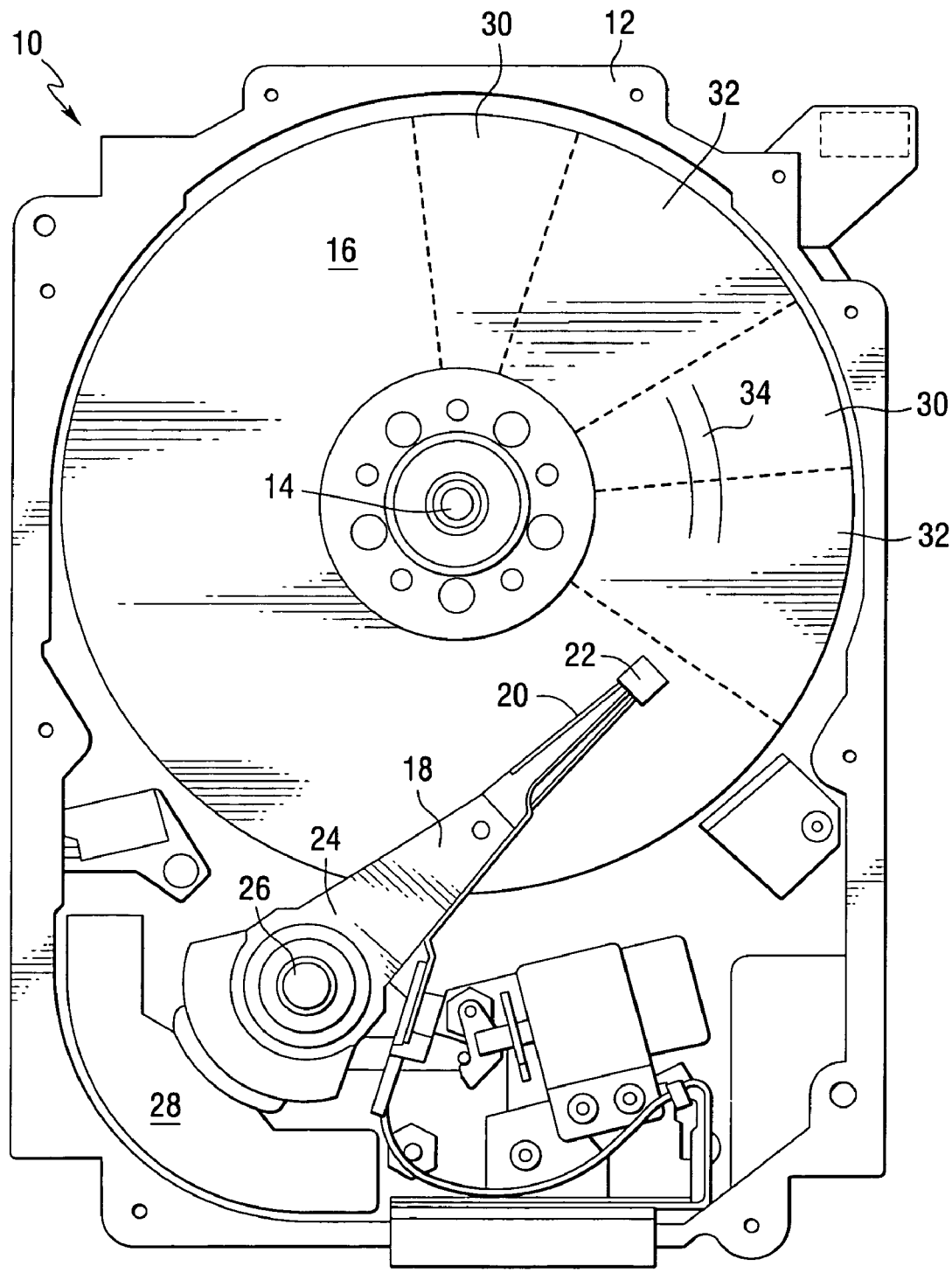
FIG. 1 is a pictorial representation of the mechanical portion of a disc drive that can be constructed in accordance with the invention.

Referring to the drawings, FIG. 1 is a pictorial representation of the mechanical portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 to a desired position. The actuator motor 28 is controlled by a controller that is not shown in this view. The disc includes a plurality of servo sectors 30 arranged between a plurality of data sectors 32. The data and servo information is contained in a plurality of tracks 34.

Figure 2:
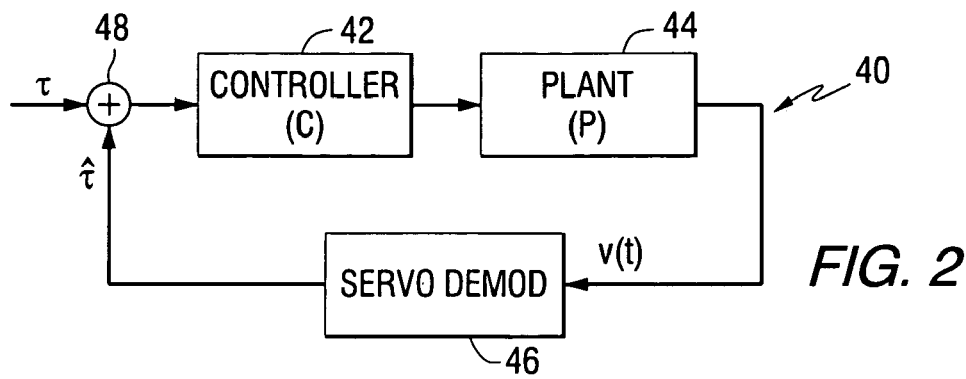
FIG. 2 is a block diagram of a servo system.

A top level servo system 40 is shown in FIG. 2. The system includes a controller 42, a plant 44, and a servo demodulator 46. The controller controls the plant to reduce the difference between a predetermined reference signal $\tau$ and its estimate $\hat{\tau}$. The servo demodulator block demodulates the position information in signal v(t) to extract the estimate of the reference signal $\tau$. The estimate and the reference signal are combined at point 48 to produce an input error signal for the controller. The controller then adjusts the plant in response to the error signal.

In the case of magnetic recording, the controller controls the spatial position of a recording head by moving it according to its input Position Error Signal (PES). The plant represents the magnetic recording system having an output v(t) readback signal corresponding to servo specific position information. The reference signal $\tau$ is set to zero for the track center, but may be other than zero if an offset is required. The demodulator block extracts the PES information within v(t), and outputs $\hat{\tau}$ as an estimate of $\tau$.

Figure 3:
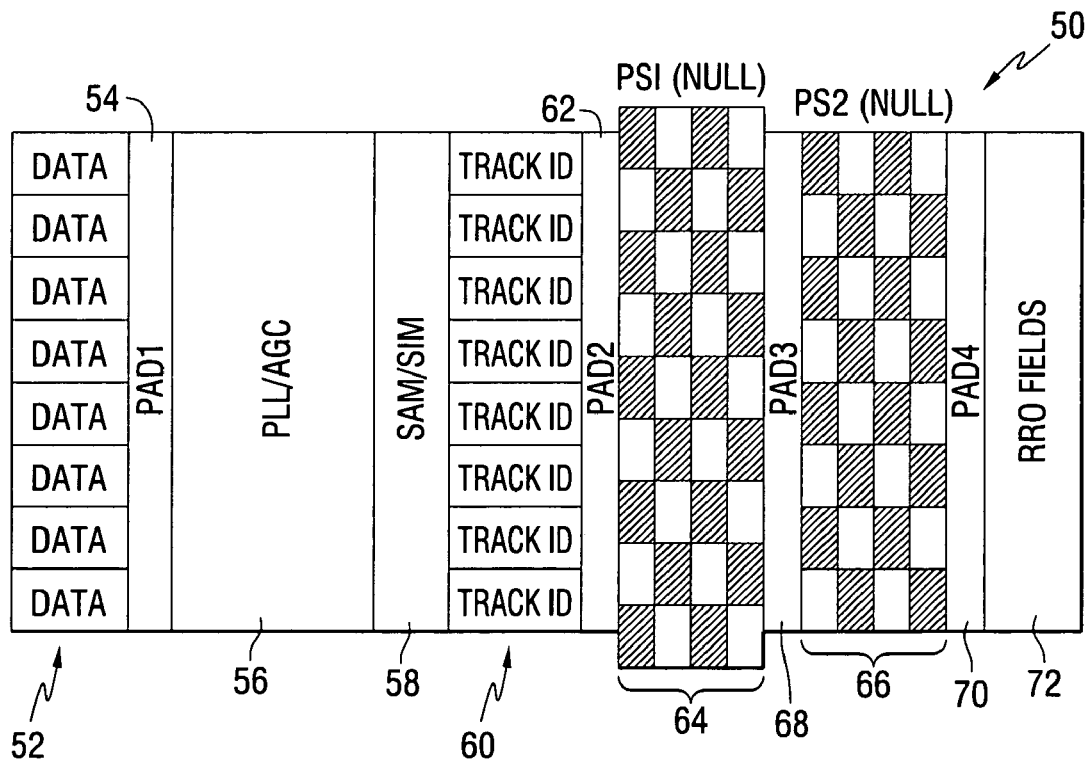
FIG. 3 is a schematic representation of the servo sector format.

FIG. 3 is a schematic representation of a servo sector format 50. After the data sectors 52 and a space 54 (PAD1) in FIG. 3, the servo sector starts with a Phase Locked Loop/Adaptive Gain Controller (PLL/AGC) field 56. The written data in this field is the same all along the cross-track direction. The PLL/AGC field is followed by a field 58 containing a Servo Address Mark (SAM) or a Servo Index Mark (SIM). One sector on the disc includes a SIM, and each of the other servo sectors includes a SAM. The SAM/SIM field is followed by a field 60 containing a gray coded Track ID for each track. The Track IDs are followed by a space 62 (PAD2) and two burst patterns 64 and 66 (PS1 and PS2), which are separated by a space 68 (PAD3). Another space 70 (PAD4) separates the second burst pattern from a repeatable runout field 72 that contains runout information for both read and write operations.

Figure 4:
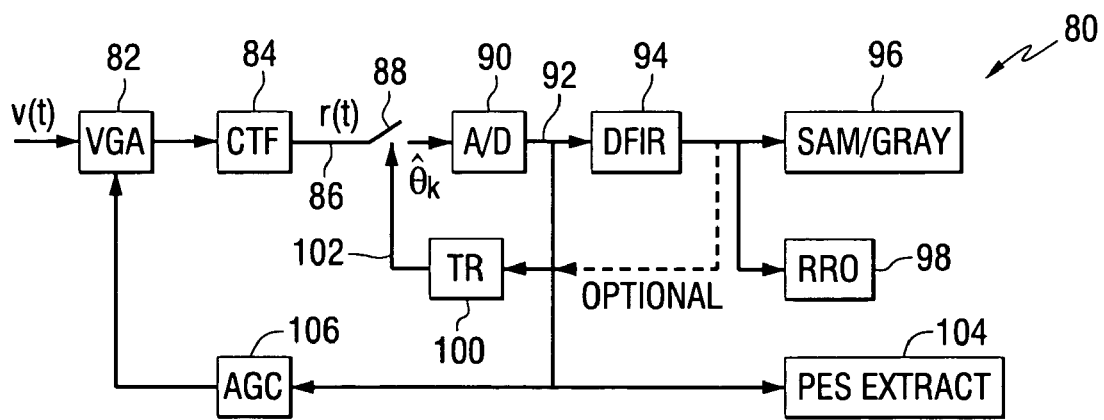
FIG. 4 is a block diagram of a servo demodulator.

FIG. 4 is a block diagram of the servo demodulator block 46 in FIG. 2, which can be used in one embodiment of the invention. An information signal v(t), extracted from the plant of FIG. 2, is received by a variable gain amplifier (VGA) 82 and filtered by a continuous time filter (CTF) 84 to produce a signal r(t) on line 86. The signal r(t) is sampled, as illustrated by a switch 88, and the sampled signal is converted to a digital signal as illustrated by analog-to-digital converter 90. The resulting digital signal on line 92 is filtered by digital finite impulse response (DFIR) filter 94. Then the SAM/GRAY code is detected as shown in block 96, and the repeatable runout information is detected as shown in block 98. The output of the analog-to-digital converter, or optionally the output of the detector, is used by a timing recovery circuit 100 to produce a sampling estimate time $\hat{\theta}_k$ on line 102. The output of the analog-to-digital converter is also used to extract a position error signal 104 and for an adaptive gain controller 106 to control the variable gain amplifier. While FIG. 4 shows a separate sampling switch 88 and an analog-to-digital converter, the sampling function can be performed in the analog-to-digital converter.

As the system reads the PLL/AGC field, the Adaptive Gain Controller (AGC) in FIG. 4 adjusts the gain of Variable Gain Amplifier (VGA), and the Timing Recovery (TR) block recovers the phase and frequency offset in the system so that the Analog-to-Digital (A/D) converter samples the analog signal at the correct sampling instances.

Next, the system reads the SAM/SIM 58 field in FIG. 3, which stores the same data for a Servo Address Mark (SAM) or a Servo Index Mark (SIM) for the cross-track direction. Since it has already adjusted the VGA and recovered the sampling instants, the servo demodulator architecture in FIG. 4 processes the samples of the readback signal corresponding to the SAM/SIM field, and detects the SAM/SIM information using the SAM/GRAY block.

The servo demodulator also detects the Track ID, using the readback signal corresponding to the Track ID field in FIG. 3. Once the Track ID of the track of interest is detected, the servo system assumes that the magnetic head is in the vicinity of the particular track center. Position signal bursts in the Position Signal 1 (PS1) and Position Signal 2 (PS2) fields follow PAD2 and are separated by another space PAD3. The servo demodulator block processes the data in PS1 and PS2 using PES Extract block in FIG. 4 to extract the Position Error Signal (PES). With the help of this signal, the servo system in FIG. 2 moves the magnetic head towards the center of the track of interest. After the PS2 field, another space (PAD4) is followed by the Repeatable Run Out (RRO) field. The information in the RRO field is detected using the RRO block in the servo demodulator, and the detected information is used to correct any possible non-zero bias in the system resulting from the effect of Repeatable Run Out during read and write operations.

In previously known systems, once the sampling phase and frequency information is recovered by the timing recovery loop in FIG. 4 using the PLL/AGC field in FIG. 3, the recovered timing offset is fixed, and the other fields within the sector are processed with this fixed sampling information. Thus, the performance of the servo demodulator architecture will be highly dependent on the performance of the timing recovery block while processing the servo fields that follow the PLL/AGC field. Any residual phase offset or frequency offset will have a direct impact on the system performance. This will be more pronounced when the amount of noise, distortions, nonlinearities, etc. increases. One way of solving this problem is to increase the length of the PLL/AGC field. However, this results in reduced servo format efficiency, which is not desirable.

This invention provides a method and apparatus that increases servo performance without increasing the PLL field length. This result is achieved by using the existing gray coded Track ID fields to further update the timing samples. Existing Track ID fields can be used to recover any phase and frequency offset remaining in the system after the PLL/AGC field so that the system performance will be more robust to timing errors.

This invention has two aspects. In the first aspect, the Track IDs are arranged to allow efficient timing recovery from the Track ID fields. In the second aspect, the phase and frequency offsets in the system are recovered using the already present timing recovery loop in servo demodulator architecture.

The Track ID fields contain gray coded information bits. In other words, each Track ID contains only one bit that is different than the Track ID bits at the neighboring tracks. The gray coded bits are mapped to symbols before being written on the media. Bi-phase mapping is applied (i.e., bits with values 1 and 0 are mapped to the 4-bit symbols [1 1 −1 −1] and [−1 −1 1 1], respectively).

Figure 5:
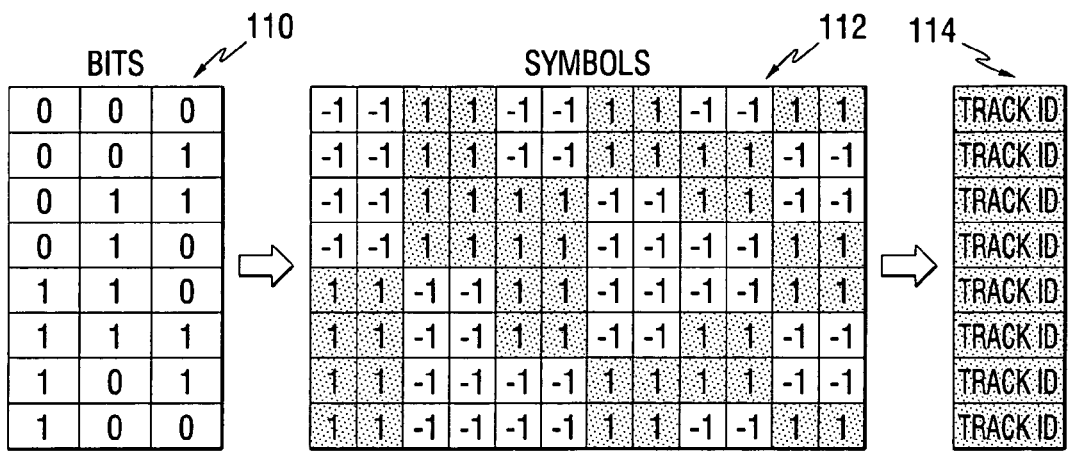
FIG. 5 is a schematic representation of a 3-bit Track ID field.

FIG. 5 is a schematic representation of a 3-bit Track ID scenario. As seen in FIG. 5, the 3-bit long Track IDs 110 are gray coded (i.e., for each track, there is only one bit different than its neighboring tracks). Each bit is mapped to its associated 4-bit long bi-phase symbol 112, and the 12-bit long Track ID information on each track is written on the media 114. The different shading for the symbols represents the magnetization orientation when the information is written on a magnetic medium.

Figure 6:
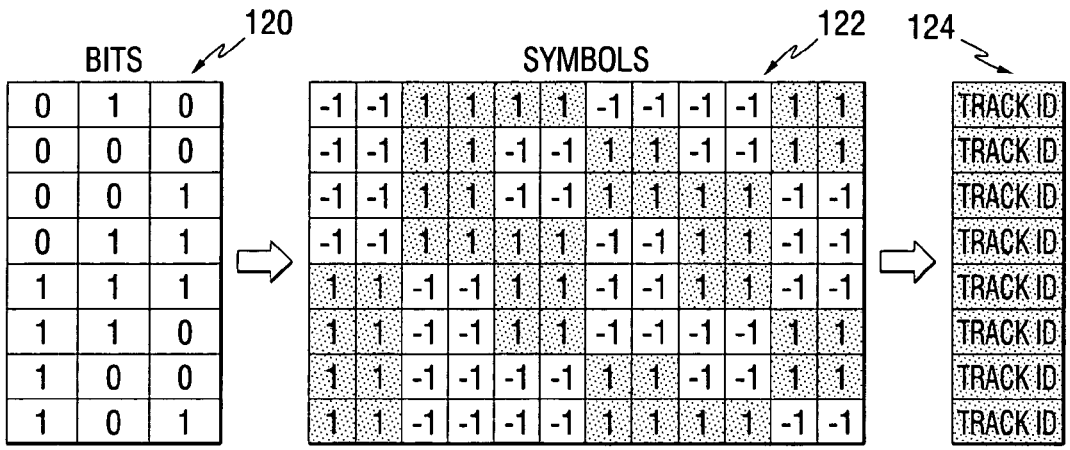
FIG. 6 is a schematic representation of an alternative 3-bit Track ID field.

The data to be written on the Track ID field is not unique. FIG. 6 shows another alternative for the Track ID fields for a 3-bit scenario, which satisfies the required gray code property. In FIG. 6, each bit of the Track ID 120 is mapped to its associated 4-bit long bi-phase symbol 122. Then, the 12-bit long Track ID information on each track is written on the media 124. Thus, the gray coded Track ID fields can be arranged based on a given objective.

Figure 7:
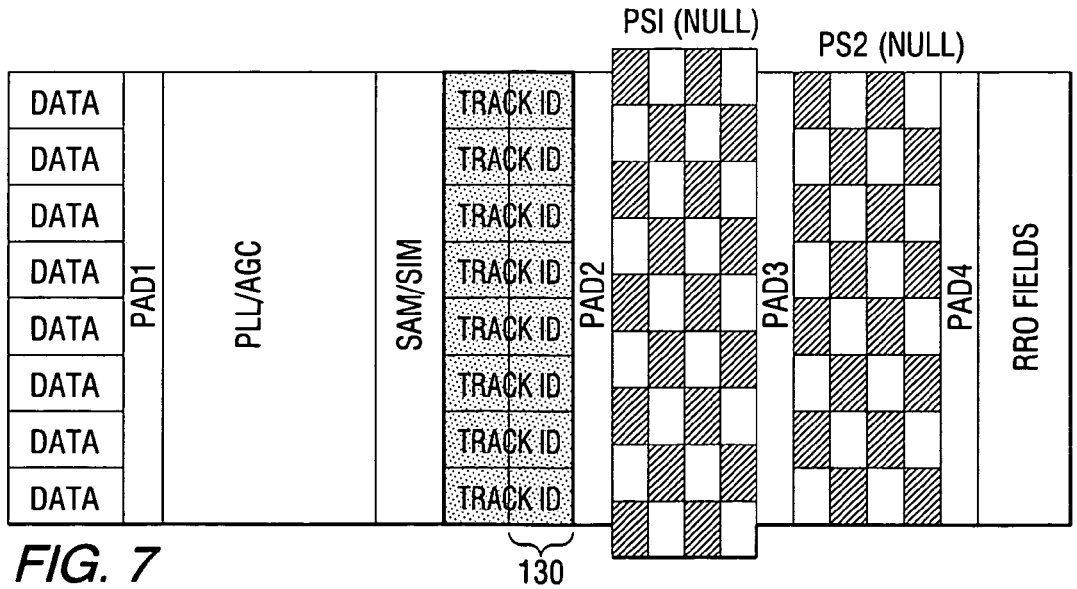
FIG. 7 is a schematic representation of criteria chosen for arranging the Track ID fields.

In the first aspect of the invention, Track ID fields are arranged such that the sampling instants of timing recovery can be adjusted using the least significant Track ID bits 130, located toward the end of the Track ID fields, which are closer to the PS burst fields, as shown in FIG. 7.

The following method can be used to arrange the Track ID fields:

1. As illustrated in FIG. 8, start with the simplest scenario where the gray coded Track ID field is represented with only N=1 bit before symbol mapping.
2. To find the gray coded Track ID fields where the number of bits is increased to N+1, take the mirror image of the Track ID fields, which have N bits. Assign those bits to be the N Most Significant Bits (MSBs) of the gray coded bits for the tracks starting from $2^N+1$. Set the Least Significant Bit (LSB) of the gray coded bits for the first $2^N$ tracks to be 0, and set the LSB of the gray coded bits for the last $2^N$ tracks (starting from $2^N+1$) to be 1. FIG. 9 is a schematic representation of the 2-bit case that is obtained using the mirror image 132 of the 1-bit case of FIG. 8.
3. Repeat step 2 until the gray coded Track ID bits reach to their desired length. FIG. 10 shows a 3-bit case that is obtained using the mirror image 143 of the 2-bit case of FIG. 9.
4. Evaluate the symbol mapping on the gray coded bits to find the resulting bits to be written on the media for the Track ID field. FIG. 11 shows the 4-bit scenario before and after the symbol mapping. The bits after the symbol mapping are written to the Track ID field location on the media, and the different shading of the mapped symbols represents the magnetization orientation on the media.

Figure 12:
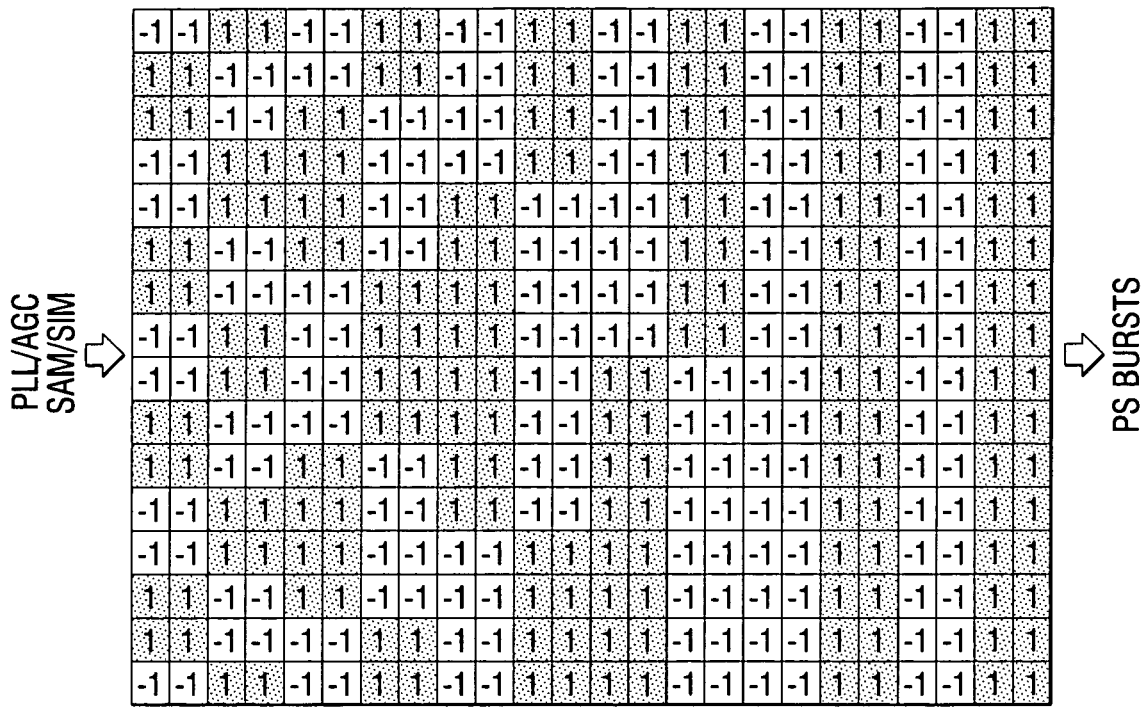
FIG. 12 is a schematic representation of a 6-bit Track ID field, after the symbol mapping.

For Track IDs longer than 4-bits, all the LSBs following the first 4 MSBs will be 0 for a group of 16 tracks. For example, FIG. 12 shows a 6-bit example with the corresponding representation of the Track IDs after the symbol mapping. The last 8 columns of FIG. 12 are the same for all the 16 tracks. If we know that the head motion in the cross-track direction is confined within these 16 tracks, the last 8 columns can be considered to be an extra PLL/AGC field for the timing recovery circuitry to recover any existing residual phase and frequency offsets in the system.

The method of the invention is independent of the number of gray coded bits used to represent the Track ID fields. Currently 16 to 20 gray coded bits are commonly used and for the examples used to illustrate the invention we will suppose the number is 20. This number becomes 80 channel bits after symbol mapping, and these 80 channel bits are written to the media for each track. The read head has different cross-track speeds during seek, settle, and tracking modes. If we assume that the head passes 513 tracks along the cross-track direction in one Track ID field during the seek mode, then we can utilize 10 extra gray coded Track ID bits or 40 channel bits for timing recovery. Similarly, if the head is assumed to travel along 33 tracks during the settle mode, we then have 56 extra channel bits, and if the head is assumed to be within 3 tracks during the tracking mode, then we have 72 extra channel bits that can be used for updating the sampling instants using the timing recovery architecture. The length of the PLL/AGC field is usually around 160 channel bits. Therefore, by just arranging the Track ID fields as explained here, we may gain from 25% (40 channel bits out of 160) to 45% (72 channel bits out of 160) extra space for updating the timing information according to the speed of the head in the system (i.e., according to the mode we are in).

The extra space that is used for adjusting the sampling instants is located at the end of the Track ID fields, that is, just before processing the PS burst fields. The timing offset can be estimated with a known length of data and recovered just before the PS burst to reduce the effects of timing offsets on the PES signal estimation functionality of the servo demodulator. Thus not only physical space, but also its location helps to improve the timing recovery performance, and hence improves the performance of the whole servo demodulation block.

In an alternative embodiment based on the above architecture (re-arranging the Track ID bits), the resulting constant frequency re-arranged bits can be positioned at the beginning of the gray code field in order to prevent increasing the length of the gray code field. One would lose the advantage of having the additional field in front of the PS bursts, but servo format efficiency would be maintained. Also, this approach would cause a non-gray encoded splice at a specific track boundary, or there could be no splice at the center track on the drive if the tracks were properly encoded.

Figure 13:
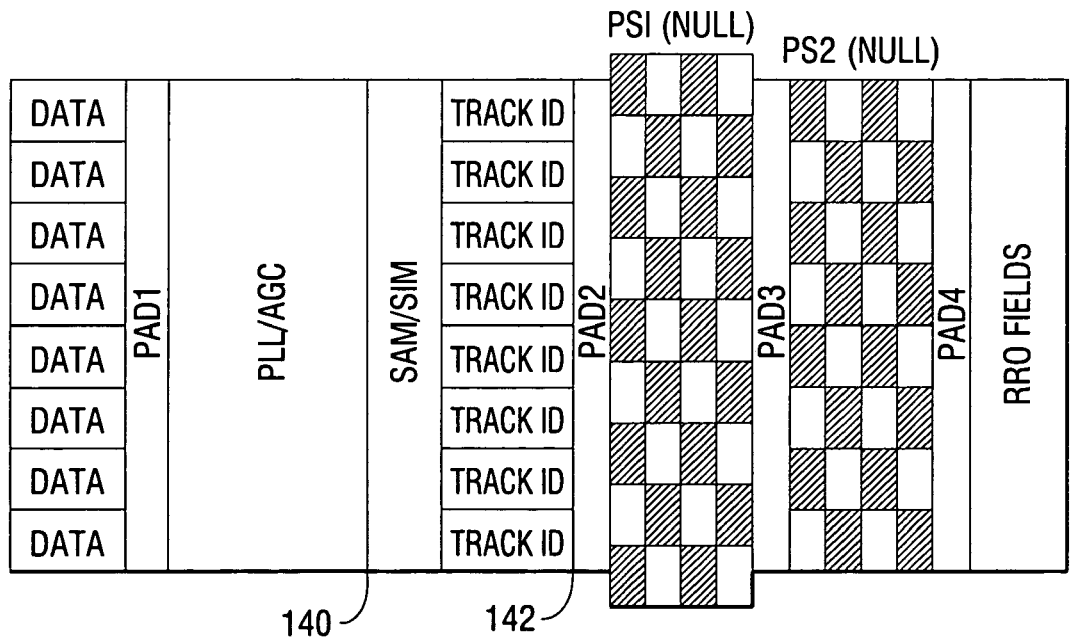
FIG. 13 is a schematic representation of the servo sector format.

The second aspect of the invention focuses on a technique for utilizing the Track ID fields to recover the accumulated phase offset and residual frequency offset before the PS bursts. FIG. 13 schematically illustrates what is meant by accumulated phase offset and residual frequency offset before the PS bursts. In FIG. 13, at the end of the PLL/AGC field, as indicated by item number 140, the recovered phase is pr, and the recovered frequency is $f_r$. The system frequency offset is $f_0$, and the residual frequency offset is $f_0-f_r$. At the point indicated by item number 142, the accumulated initial phase is:

$$(f_0-f_r) \times (\text{SAM/SIM Length} + \text{Track ID Length}) + p_r.$$

For example, the accumulated initial phase can be:

$$(0.03-0.0244) \times (9 \times 4 + 20 \times 4) + 0.01 \approx 0.66L,$$

where L is the clock period.

Figure 14:
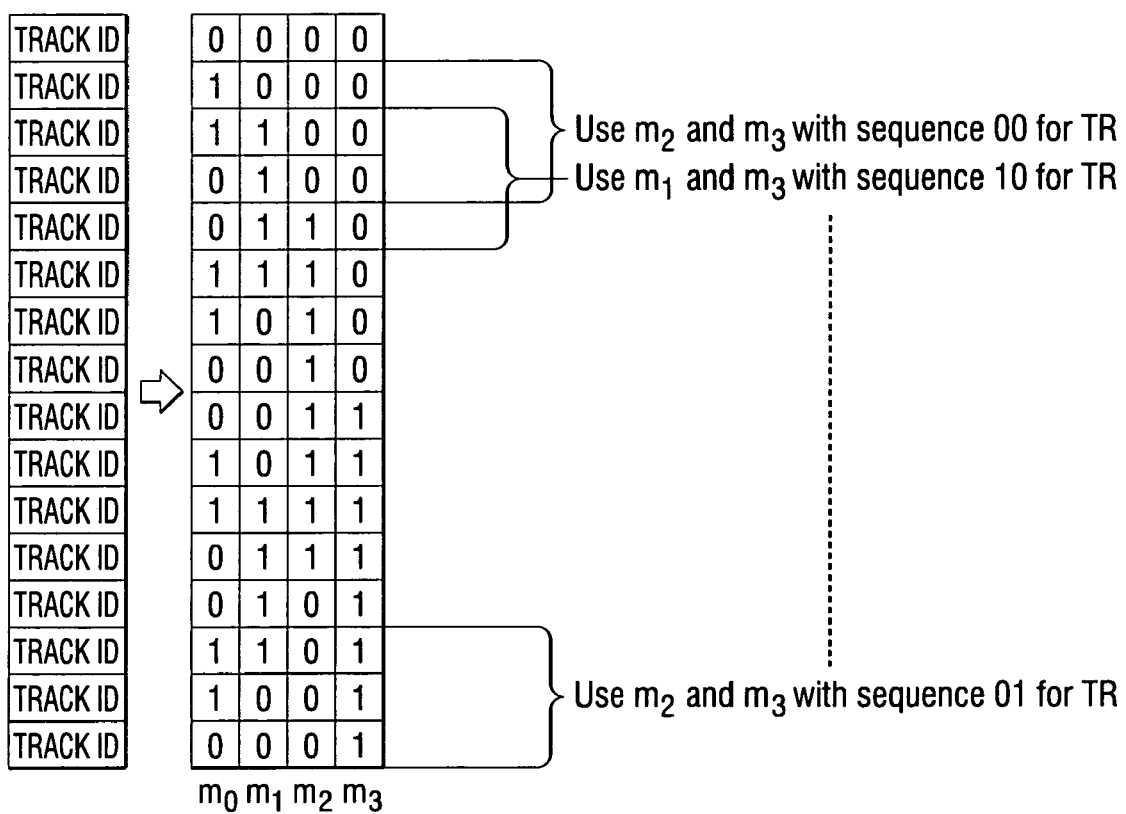
FIG. 14 is a schematic diagram that illustrates the bit selection process.

If the bits are considered to be arranged in columns, as in the examples of FIGS. 11 and 12, then particular columns to be used for the timing recovery loop must be identified in addition to the data sequence on those columns. This can be explained by referring to the example in FIG. 14.

Where complete columns of bits are not identical, the locations of identical bits within a selected column of Track IDs must be determined so that the bits in those locations can be used for timing recovery. In FIG. 14, the magnetic head is assumed to be confined within 3 servo tracks. For example, if the head is somewhere on the $2^{nd}$, $3^{rd}$, or $4^{th}$ track, then the timing recovery should use the bits in columns $m_2$ and $m_3$ with sequence [0 0]. If the head is on the $3^{rd}$, $4^{th}$, or $5^{th}$ tracks, then the columns to be used become $m_1$ and $m_3$ and the sequence changes to [1 0]. If the head happens to be on the $14^{th}$, $15^{th}$, and $16^{th}$ track, then the columns to use will be $m_2$ and $m_3$ with sequence [0 1].

FIG. 14 illustrates the need for a systematic way of determining which column and sequence to use for timing recovery. To systematically determine the columns and sequence, assume that we want to go to the $T^{th}$ track, and the read head is confined within M servo tracks where M is an odd number. Under these assumptions, determine the bits at each column.

For each column $m_i$ (as labeled in FIG. 14), find the minimum $k_i$ that satisfies $$2^{m_i}(2k_i+1) \geq T \tag{1}$$

where $k_i$ specifies the number of magnetic transitions encountered when moving to track T within the specified column $m_i$. If $k_i$ is even, set the bit value at the $T^{th}$ row of column $m_i$ as 0. Otherwise, assign the bit value to 1.

A specific example will now be described based on the case in FIG. 14, where we assume that we want to go to the $4^{th}$ track (i.e., where T is 4), and the read head is already assumed to be confined within 3 servo tracks (i.e., M=3). For T=4, the values for $k_0$, $k_1$, $k_2$ and $k_3$ can be found from equation (1) to be 2, 1, 0, 0, respectively, and the bit stream for the $4^{th}$ row (i.e., the desired track) would be [0 1 0 0], as 0 is assumed to be even.

In order to determine which columns to use, two variables are introduced, where $m_{lrg}$ is defined as the rightmost column, and $m_{min}$ is the minimum column that satisfies $2^{m_{min}} > M$. Under these definitions:

1. Start with $m_i = m_{lrg}$.
2. Check if the following expression is satisfied:

$$2^{m_i}(2k_i+1) + \frac{(M-1)}{2} \geq T \geq 2^{m_i}(2k_i+1) + \frac{(M-3)}{2} \tag{2}$$

3. If the expression in equation (2) is satisfied, skip column $m_i$, accept all columns including $m_{min-1}$, and set $m_i$ to be $m_{min}$.
4. If the expression in equation (2) is not satisfied, accept column $m_i$ and set $m_i$ to be $m_{i-1}$.
5. Repeat steps 2, 3, and 4 until $m_i$ is equal to $m_{min}$.

Thus, the columns of the Track ID field which are to be utilized for the timing recovery circuitry will be the ones which are accepted, and the sequence which will be input to the timing recovery loop will be the bits at those accepted columns.

Using the same illustrative example (i.e., T=4 and M=3 case for FIG. 14), we find $m_{lrg}$ to be $m_3$ and $m_{min}$ to be $m_2$. For these specific values and the already calculated $k_i$'s, we see that the expression in equation (2) is not satisfied for $m_3$ (thus accept $m_3$), and is satisfied for $m_2$ (thus skip $m_2$ and accept $m_1$). As a result, the columns $m_1$ and $m_3$ will be utilized for the timing recovery loop with the sequence [1 0] (as we have found the bit stream for the desired track to be [0 1 0 0]). The calculations needed to identify the appropriate columns can be performed by the servo demodulator or by a system controller that supplies information to the servo demodulator.

Figure 15:
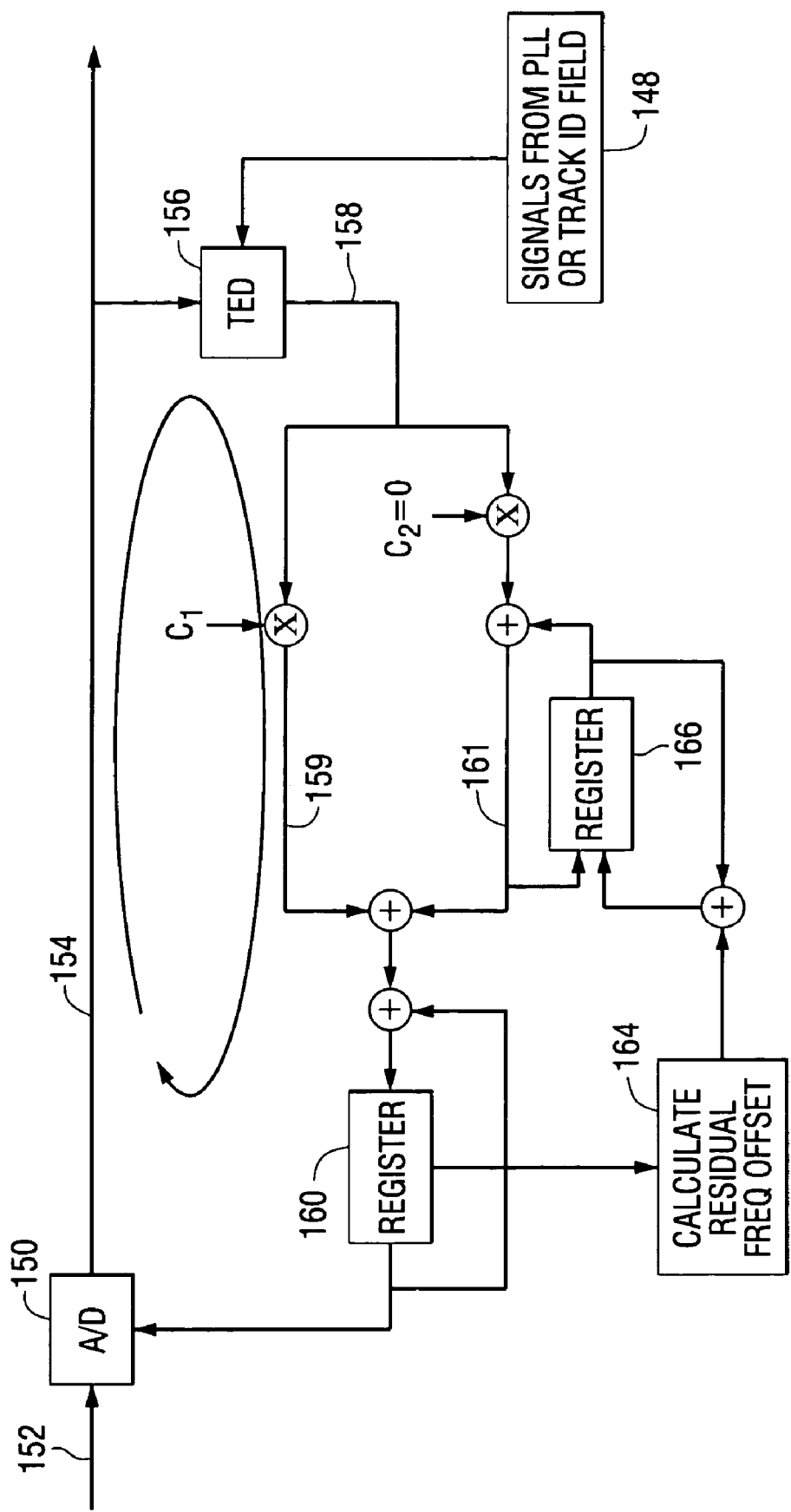
FIG. 15 is a functional diagram of the timing recovery of the system of FIG. 4.

FIG. 15 is a functional diagram of the timing recovery of the system of FIG. 4. The analog-to-digital converter 150 samples the signal on line 152 and produces a digital signal on line 154. The digital signal is processed, along with an ideal signal 148 produced using the PLL/AGC field, and the Track ID field by a timing error detector 156 to produce an error signal on line 158. The error signal will be used (after processing) to control the analog-to-digital converter. In a first order timing recovery feedback loop, the error signal is multiplied by a constant $c_1$ ($c_2$=0). In a second order timing recovery feedback loop, the error signal is also multiplied by a constant $c_2$. A register 160 receives the feedback signals from circuit branches 159 and 161, and produces a signal that can be used to control the timing of the analog-to-digital converter. The values in the register can also be used to calculate the residual frequency offset as illustrated by block 164. The residual frequency offset can be supplied to a second register 166. To update the timing instants, the timing loop is initially set to the first order timing loop. Then the accumulated phase is recovered. The dominant source for accumulated phase is assumed to be the residual frequency offset in the system. The change in register 160 is used to update the timing phases. Then the residual frequency offset is calculated and the frequency offset register 166 is updated.

This invention reduces the effects of accumulated phase offset and residual frequency offset before the PS bursts by utilizing the Track ID fields. The methods described below are independent of the architectures to be employed for timing recovery. For example, the timing recovery architectures may be, but are not constrained to be, implemented using timing recovery feedback loops based on either: (1) synchronous sampling where the timing recovery architecture controls the sampler through a kind of oscillator, for example Voltage Controlled Oscillator (VCO); or (2) asynchronous sampling where the analog signals are sampled by a free running clock, and the outputs of the sampler are processed by the timing loop using interpolation filters in the digital domain.

Method 1: Assume that both the phase offset and frequency offset values change during SAM/SIM and Track ID fields.

The impurities in a given magnetic storage system might be so severe that both the phase offset and frequency offset values change during the time that the read head crosses the SAM/SIM and Track ID fields in the servo format. In that case, we can recover the accumulated phase offset and residual frequency offset as follows. First, pre-design the timing loop parameters such that the second order timing recovery loop already present in the system can recover even the worst case accumulated phase offset and residual frequency offset within the available Track ID field length to be utilized for timing recovery. Then, set the timing loop parameters (c1 and c2 of FIG. 15) to the pre-designed ones before the timing recovery loop starts processing the available Track ID fields for timing recovery. Next, recover the accumulated phase offset and residual frequency offset using the Track ID fields.

This method recovers both the accumulated phase offset and residual frequency offset at the same time. However, only a portion of the Track ID field is used to recover both of them. Thus, a fast timing loop response would be required, which results in noisier estimates.

Method 2: Assume that the phase offset value changes but the frequency offset value is constant during SAM/SIM and Track ID fields.

Although the impurities within a magnetic storage system may be very severe, it may still be acceptable to assume that the frequency offset remains constant during the SAM/SIM and Track ID fields. Thus, any change in the sampling instants is associated with the phase offset. In this case, we can recover the accumulated phase offset and residual frequency offset as follows. First, predetermine the first order timing loop parameter such that the first order timing recovery loop (reduced version of the second order loop already present in the system) can recover the worst case accumulated phase offset within the available Track ID field length to be utilized for timing recovery. Then, set the timing loop parameter to the predetermined one before the reduced version of the timing recovery loop (first order loop) starts processing the available Track ID fields for timing recovery. Next, recover the accumulated phase offset using the Track ID fields. Then, find the change in the register value, which is used to update the timing phases. This indicates the amount of phase accumulation in the system. Next, assume that the dominant noise source for the phase accumulation during the SAM/SIM field and the portion of the Track ID field (which is not utilized during timing adjustment) is the residual frequency offset. Then, calculate the residual frequency offset and update the value of the residual frequency offset register in the system.

This method recovers the accumulated phase offset much faster than recovering both the accumulated phase offset and residual frequency offset. However, it assumes that the frequency offset is constant for the whole process.

Method 3: Assume only a constant frequency offset value during SAM/SIM and Track ID fields.

Unlike method 2, this method assumes that the phase offset changes during SAM/SIM and Track ID fields are either too small to consider or its effect is very minor compared to the residual offset present during the mentioned fields. This assumption is justified with real signals.

Figure 16:
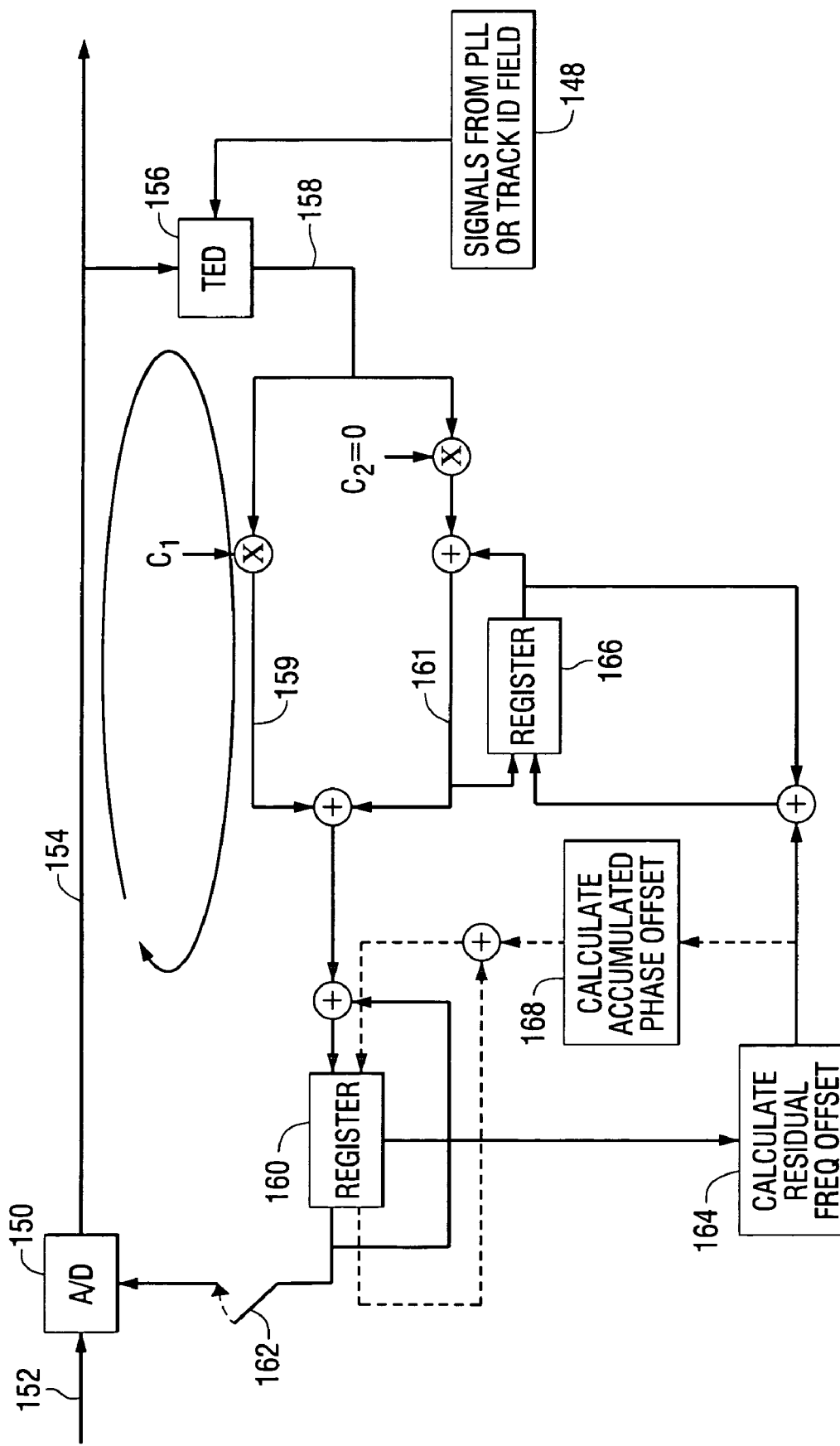
FIG. 16 is a functional diagram of an alternative timing recovery technique.

FIG. 16 is a functional diagram of an alternative timing recovery technique. FIG. 16 includes many of the components of FIG. 15, which are identified by the same item numbers in both FIGS. 15 and 16. FIG. 16 adds a switch 162, and a block 168 for calculating the accumulated phase offset.

The collected real signals show that the residual frequency offset in the system can be approximated fairly well with a constant number. Then the accumulated phase offset and residual frequency offset can be recovered as follows. First predetermine the timing loop parameter such that the first order timing recovery loop (reduced version of the second order loop already present in the system) can observe the worst case accumulated phase offset within the available Track ID field length to be utilized for timing recovery. Then set the timing loop parameter to the already predetermined one before the reduced version of the timing recovery loop (first order loop) starts processing the available Track ID fields for timing recovery. Next break the timing loop by opening switch 162, and observe the value of register 160 that is used to update the timing phase. Then find the change in the value in register 160. This indicates the amount of phase accumulation in the system. Assume that the dominant noise source for the phase accumulation during the SAM/SIM field and the portion of the Track ID field is the residual frequency offset. Then, calculate the residual frequency offset. Next, update the value of the frequency offset register 166 in the system. Then restore the initial value of register 160 before breaking the timing loop. This can be done either by calculating the value as shown in block 168 using the result of the estimation of residual frequency offset, or it can be done by simply storing the initial value somewhere and then restoring that value in resister 160. This method is simple to implement, however, it assumes a constant frequency offset and no significant effects for the phase offset.

As shown above, the methods of utilizing the existing Track ID fields to recover any accumulated phase offset and residual frequency offset have two aspects. In the first aspect the Track IDs are arranged to have identical least (or most) significant bits in adjacent tracks, and in the second aspect, particular bits of the Track ID fields are identified and used for timing recovery. The resulting architecture for a given magnetic recording system might be only the second aspect, or a combination of the two aspects. Two specific example architectures are discussed below, to illustrate some of the many alternatives that can use the methods and apparatus described above.

Example Architecture 1: In this example architecture, we employ both the first and second aspects of the invention. In other words, arrange the Track IDs as explained above, and then send the necessary information (for example, the desired Track ID number, or the sequence to be used for timing recovery circuitry in servo demodulator) from the controller block to the servo demodulator block. Next, adjust the sampling time instants using one of the methods described above.

Using this architecture, sampling updates can be done at any of the seek, settle, and tracking modes of the servo operation. Thus, this can also be a solution for any timing offsets occurring during servo operations (like the effect of radial incoherence). The sampling update will be done more frequently, since it can be done in all three modes. Thus, the system will be more robust to accumulated phase offset and residual frequency offset in the system.

Example Architecture 2: This example architecture uses only the second aspect of the invention. More specifically, the Track ID fields are not arranged as above, and information is not sent from a servo controller to the servo demodulator block. Instead, the necessary information for timing recovery is extracted within the servo demodulator block during the tracking mode as follows.

During the tracking mode, the read head is assumed to be within only half a track away from the center of the track. Thus, the quality of the readback signal corresponding to the Track ID field will be high, except for at most one sample (as the Track IDs are gray coded).

An estimate of the quality of the received Track ID samples is made. For example, referring to FIG. 4, samples on line 92 can be correlated with a set of predetermined values. If the absolute value of the correlation is larger than a predetermined threshold, then the quality is acceptable; else, the quality is not acceptable. If the correlation is negative, then the correlation is not acceptable. The estimation of the Track ID samples effectively uses decision directed timing recovery. If the quality is not acceptable, don't estimate the Track ID bit value for that sample, and skip that sample. If the quality is acceptable, estimate the Track ID bit value for that sample and accept that bit. Then, adjust the sampling time instants using one of the methods explained above together with the accepted bit value estimates. These steps are repeated until the end of the Track ID field during tracking mode.

With this architecture, sampling updates will be done during the tracking mode. Thus, the system will be more robust to accumulated phase offset and residual frequency offset in the system. In addition, it does not require any system level design changes, since there is no information flow from controller block to servo demodulator block.

Employing decision directed timing recovery implies that we process the Track ID samples. However, finding the quality of the Track ID samples and also their estimations increase the timing loop latency. This will reduce the effect of timing recovery loops to fast timing errors. On the other hand, Example Architecture 1 does not include any extra loop latency, which means that it performs better against fast timing errors than the second example architecture.

The performance of this method also depends on the performance of the estimation of the Track ID samples. The estimation of the Track ID samples can never be better than using their ideal values, as proposed in Example Architecture 1. Thus, the performance of this second architecture can never be better than the first one.

These two example architectures are illustrative examples of two of many that result from the method and apparatus of the invention. A specific one should be determined according to the requirements of a given magnetic recording architecture.

The performance of this invention has been simulated. Simulation results illustrate the effectiveness of the algorithms described above. For this purpose, we choose a system with a worst case frequency offset of 3% of the channel clock T, and a worst case phase offset of T/2. We then design the timing recovery parameters to recover the worst case timing offsets within 40 servo cycles (or 160 samples), which is assumed to be the length of the PLL/AGC field.

Figure 18:
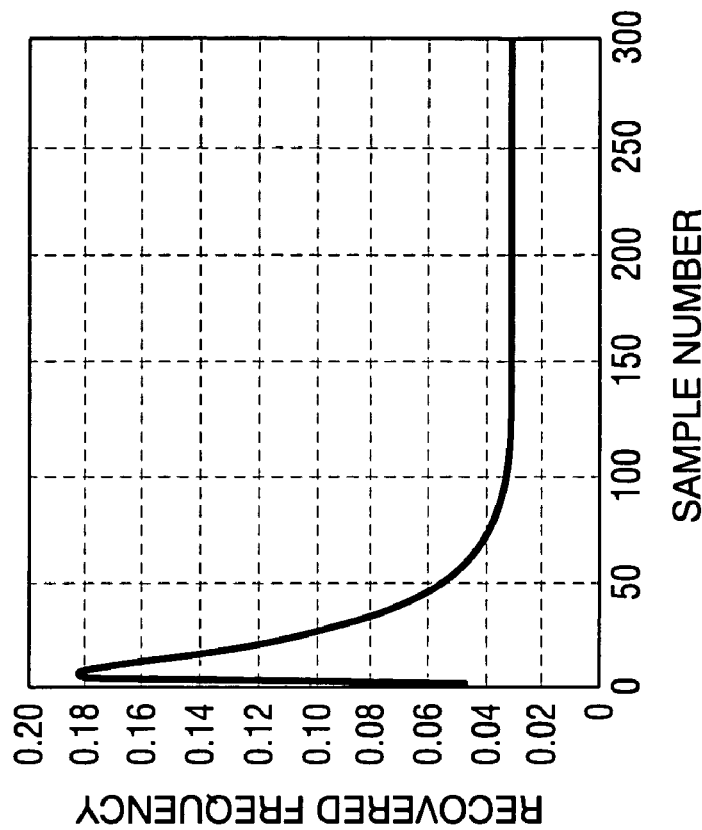
FIGS. 17 and 18 show recovered phase and frequency offsets as functions of sample number for no noise in the system.
Figure 17:
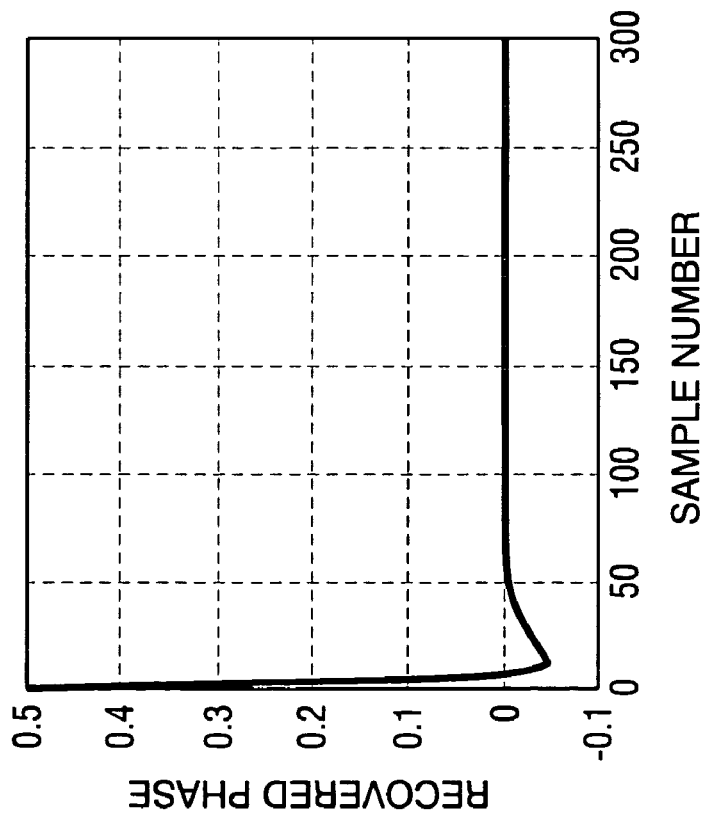

FIGS. 17 and 18 show the recovered phase and frequency offsets as functions of sample number for no noise in the system. At the $160^{th}$ sample, the recovered phase is 0 and the recovered frequency is 3% of the T-clock, as desired. However, in the presence of noise, the recovered phase and frequency offsets fluctuate around their desired values as shown in FIGS. 19 and 20.

Figure 19:
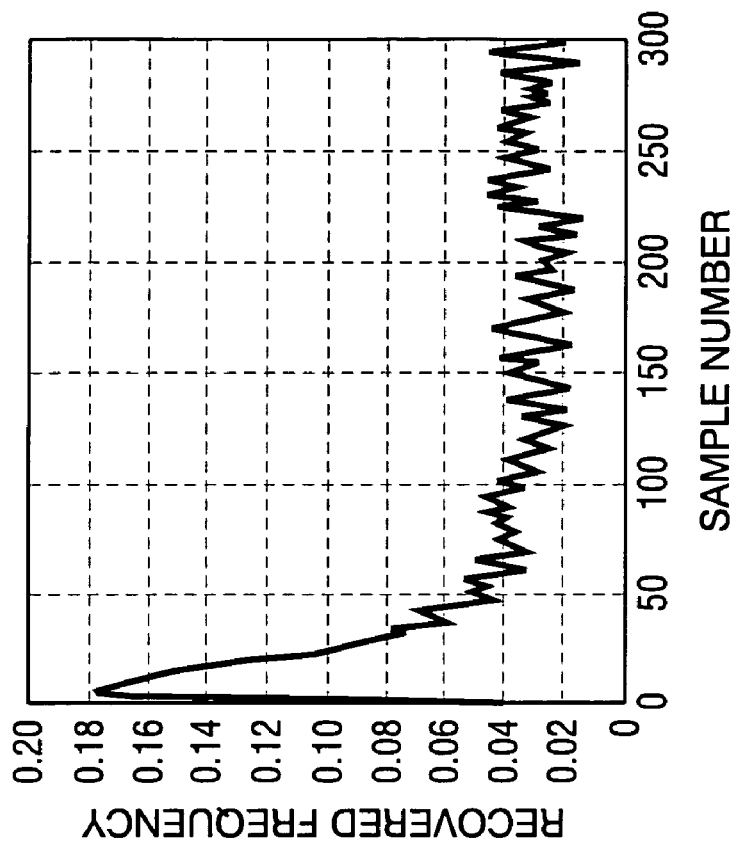
FIGS. 19 and 20 show recovered phase and frequency offsets as functions of sample number for SNR=30 dB in the system.
Figure 20:
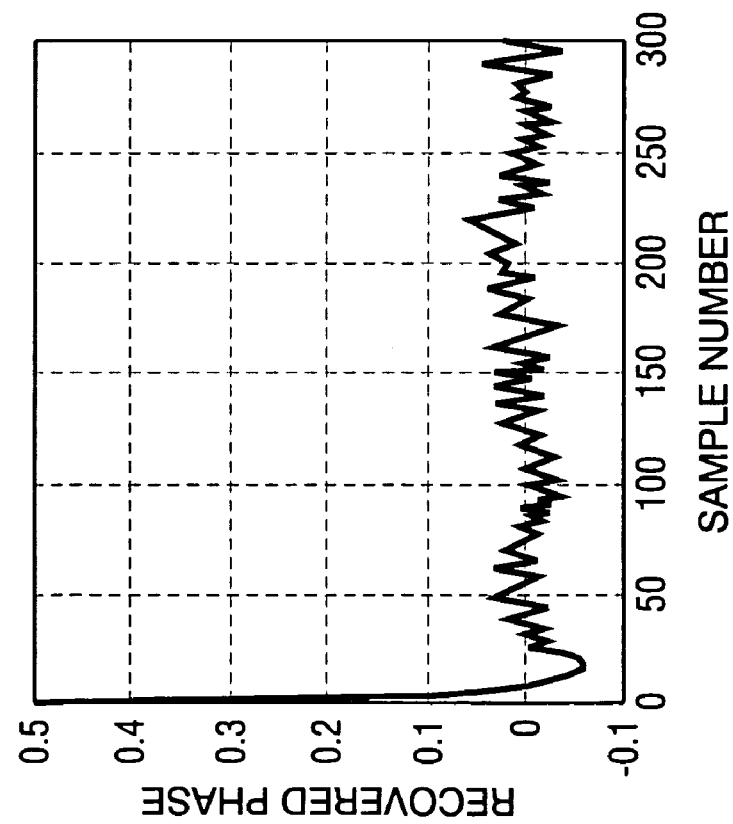
Figure 22:
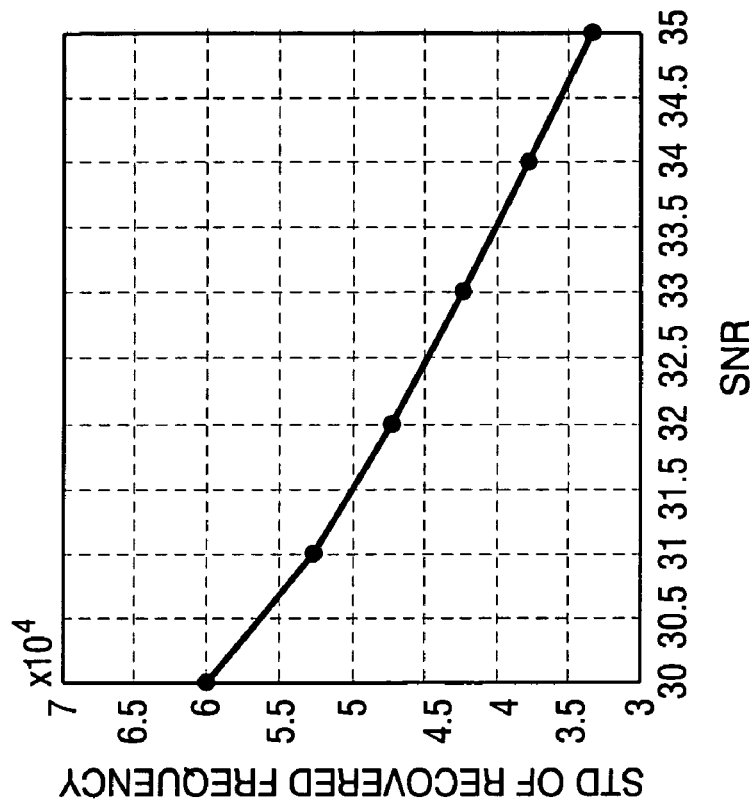
FIGS. 21-26 are graphs of various parameters versus signal-to-noise ratio.
Figure 21:
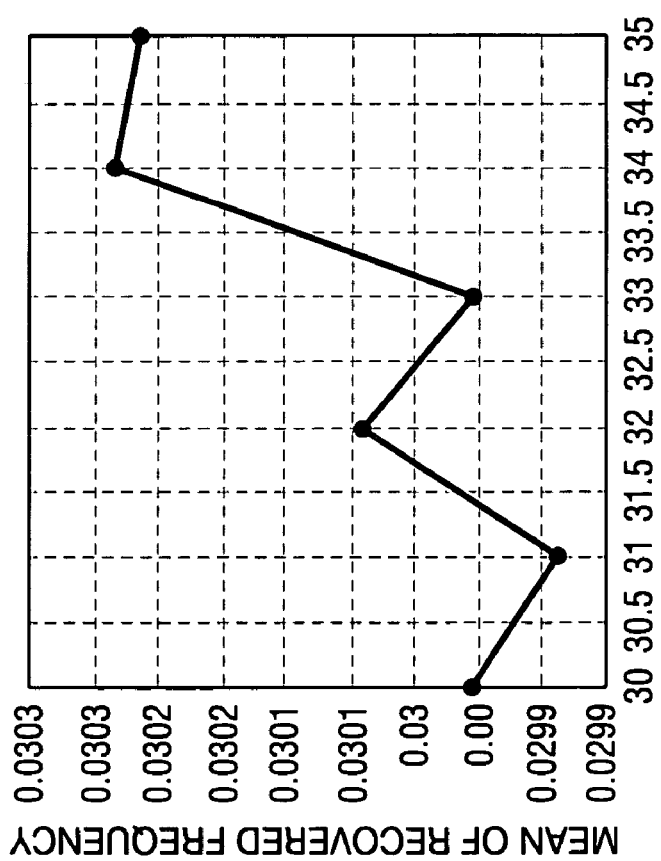

FIGS. 19 and 20 show the recovered phase and frequency offsets as functions of sample number for SNR=30 dB in the system. The recovered phase and frequency offset values at the $160^{th}$ sample for the case shown in FIGS. 19 and 20 are 0.01 T and 2.44% of the T-clock. Although these values are close to their desired values, they are not identical to their desired values. The mean value of the recovered frequency and the standard deviation of the recovered frequency (which is 3% of T-clock in this example) is shown in FIGS. 21 and 22. As seen from FIGS. 21 and 22, although the mean value of the recovered frequency is very close to its true value, its standard deviation from the true value becomes larger with more noise (i.e., less SNR) in the system. This means that, for small SNR values, the deviation of the recovered frequency offset will be large most of the time, and there will be some residual frequency offset in the system. This residual frequency offset causes accumulated phase offset at the beginning of the PS burst fields in the servo format. For example, for the case in FIGS. 19 and 20, the residual frequency offset is 3%−2.44%=0.56% of the T-clock. For a SAM/SIM field length of 36 samples and for a Track ID field length of 80 samples, the residual frequency offset causes an accumulated phase offset of 65% of the T-clock. This is a considerable amount of phase offset, and can affect the performance of the system. Moreover, if the residual frequency offset is not recovered, the accumulated phase offset increases even more during the PS burst fields, and can cause catastrophic performance losses for Position Error Signal (PES) estimation performance of the servo demodulator.

Figure 24:
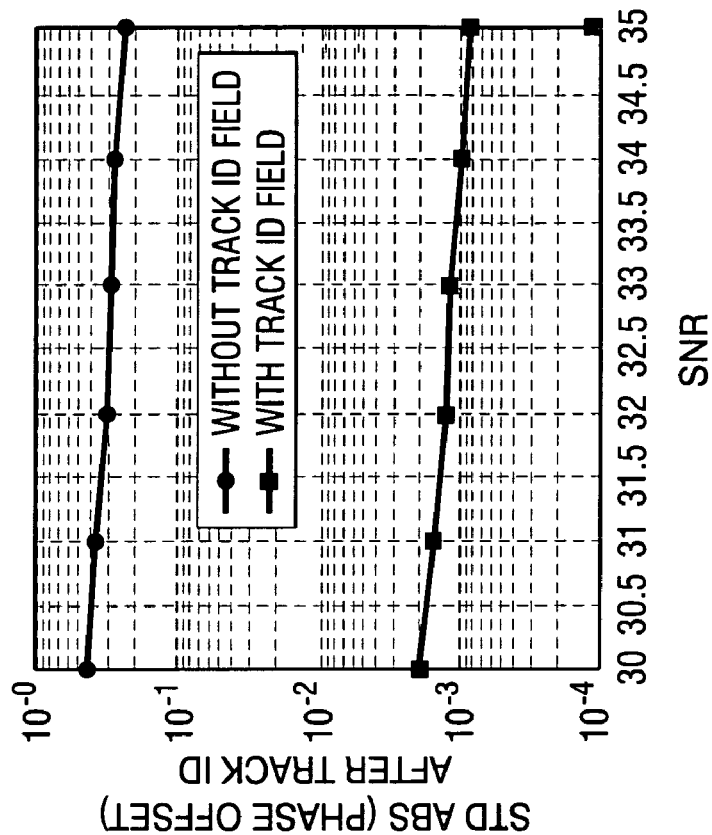
Figure 23:
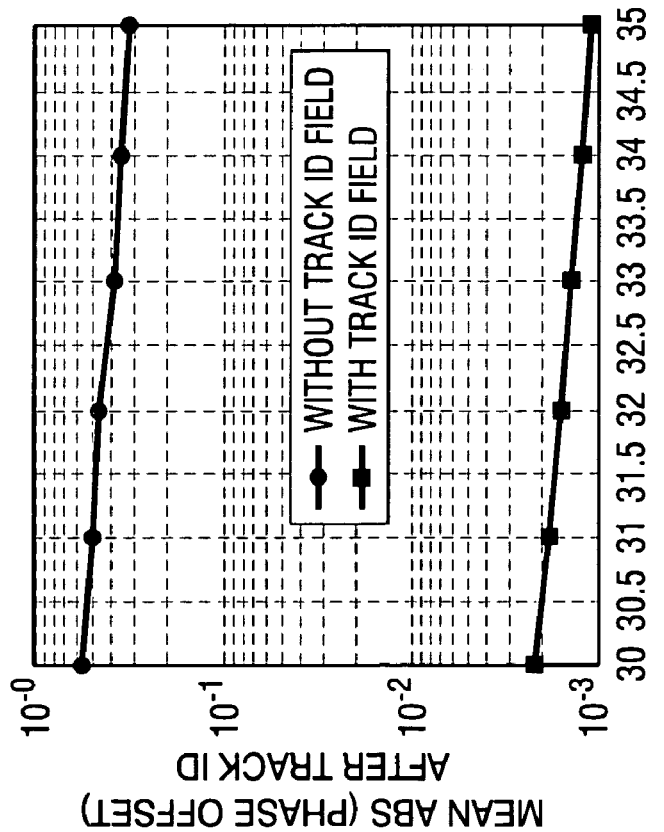

The invention has been simulated based on the assumption that the residual frequency offset is constant after the PLL/AGC field. FIGS. 23 and 24 show the calculated mean value of the recovered phase offset and the standard deviation from its true value, after the Track ID fields, with or without utilizing the Track ID field for timing recovery. One thousand PLL fields with length 160 were used to obtain the statistics at each SNR point.

Figure 26:
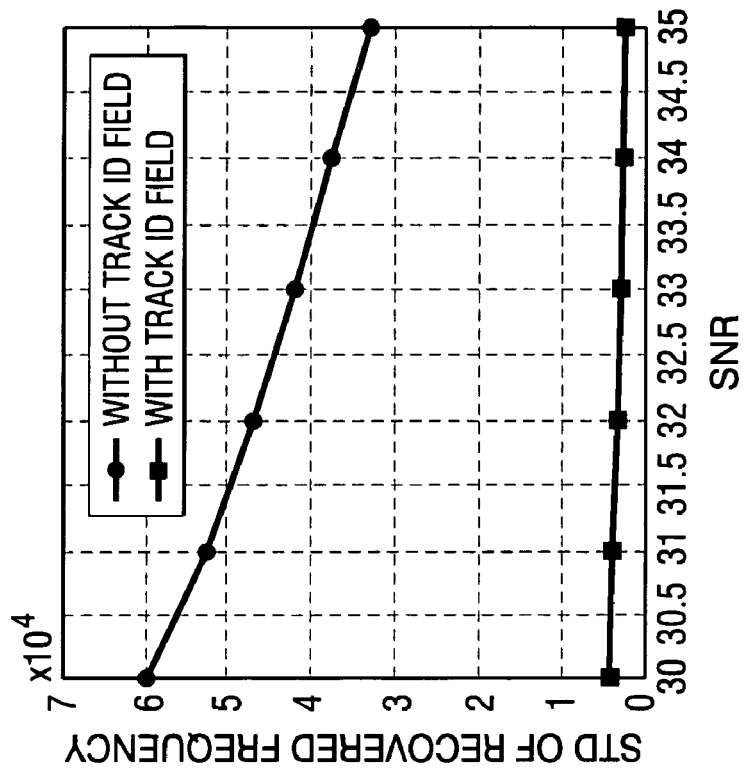
Figure 25:
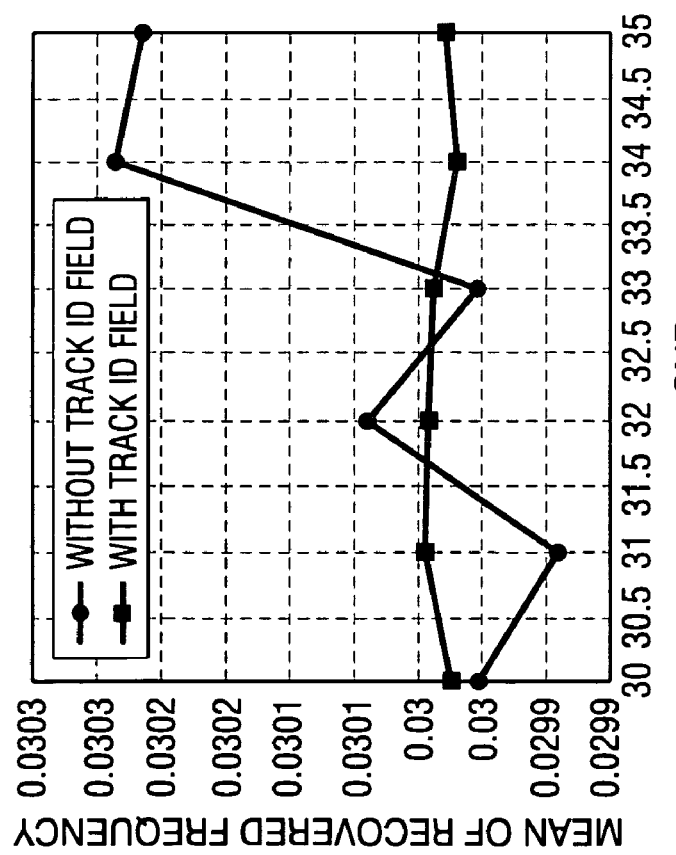

FIGS. 25 and 26 show the calculated mean value of the recovered residual frequency offset and the standard deviation after the Track ID fields, with or without utilizing the Track ID field for timing recovery.

For the simulation, only half of the Track ID fields were utilized within the timing loop. This means that as long as the read head cross-track speed does not exceed 513 tracks within one servo sector, the timing recovery can utilize that much of the Track ID fields during all the seek, settle, and tracking modes of servo operation. As seen from FIGS. 22-25, utilizing the Track ID fields not only recovers the accumulated phase offsets before processing the PS bursts, but also reduces the amount of residual frequency offset in the system so that the accumulation of the phase offset after the Track ID fields will be minimal.

While the invention has been described in terms of several examples, it will be apparent to those skilled in the art that various changes can be made to the described examples without departing from the scope of the invention as set forth in the following claims.

What is claimed is:

1. An apparatus comprising:
a data storage medium having a plurality of servo sectors and a plurality of data sectors, wherein each of the servo sectors includes a phase locked loop field and a track identification field, wherein the track identification field includes a plurality of gray coded bits for each of a plurality of tracks with the least significant bit in each track being identical;
a controller for controlling the position of a recording head with respect to the data storage medium; and
a servo demodulator for recovering timing information from both the phase locked loop field and the track identification field, wherein the least significant gray code bit in each of the plurality of tracks is used in recovering timing information from the track identification field, and the servo demodulator further producing a timing estimate.

2. The apparatus of claim 1, wherein:
the track identification field includes a plurality of bi-phase mapped gray codes.

3. The apparatus of claim 1, wherein the least significant bit is located at the end of the track identification field.

4. The apparatus of claim 1, wherein the least significant bit is at the beginning of the track identification field.

5. The apparatus of claim 1, wherein:
the servo demodulator uses selected bits In groups of the track identification fields to recover timing information, and uses the selected bits to produce the timing estimate.

6. The apparatus of claim 1, wherein:
the track identification field is used to recover accumulated phase offset and residual frequency offset.

7. An apparatus comprising:
a data storage medium having a plurality of servo sectors and a plurality of data sectors, wherein each of the servo sectors includes a phase locked loop field and a track identification field;
a controller for controlling the position of a recording head with respect to the data storage medium; and
a servo demodulator for recovering timing information from both the phase locked loop field and the track identification field, and for producing a timing estimate;
wherein the servo demodulator includes:
a first order timing recovery feedback loop; and
a second order timing recovery feedback loop.

8. A method comprising:
reading servo data from a plurality of servo sectors on a data storage medium, wherein each of the servo sectors includes a phase locked loop field and a track identification field;
recovering timing information from both the phase locked loop field and the track identification field, wherein the track identification field includes a plurality of gray coded bits for each of a plurality of tracks with the least significant bit each track being identical; and
producing a timing estimate for controlling the position of a recording head with respect to the data storage medium, wherein the least significant gray code bit in each of the plurality of tracks is used in recovering timing information from the track identification field.

9. The method of claim 8, wherein:
the track identification field includes a plurality of bi-phase mapped gray codes.

10. The method of claim 8, wherein the least significant bit is located at the end of the track identification field.

11. The method of claim 8, wherein the least significant bit is at the beginning of the track identification field.

12. The method of claim 8, further comprising:
identifying bits in groups of track identification fields to be used to recover timing information, and using the identified bits to produce the timing estimate.

13. The method of claim 8, wherein the timing estimate is produced during a seek, settle or tracking mode.

14. The method of claim 8, wherein the track identification field is used to recover accumulated phase offset and residual frequency offset.

15. A method comprising:
reading servo data from a plurality of servo sectors on a data storage medium, wherein each of the servo sectors includes a phase locked loop field and a track identification field;
recovering timing information from both the phase locked loop field and the track identification field;
producing a timing estimate for controlling the position of a recording head with respect to the data storage medium; and
using a first order timing recovery feedback loop and a second order timing recovery feedback loop to produce a signal for controlling sample timing.

16. The method of claim 15, further comprising:
setting parameters of either the first order timing recovery feedback loop or the second order timing recovery feedback loop to recover a worst case accumulated phase offset.

17. The method of claim 15, wherein the signal is stored as values in a register.

18. The method of claim 17, wherein values in the register are used to calculate residual frequency offset.

* * * * *

UNITED STATES PATENT AND TRADEMARK OFFICE
CERTIFICATE OF CORRECTION

PATENT NO. : 7,349,167 B2
APPLICATION NO. : 11/190324
DATED : March 25, 2008
INVENTOR(S) : Mehmet Fatih Erden et al.

It is certified that error appears in the above-identified patent and that said Letters Patent is hereby corrected as shown below:

In the Claims

Column 13, Line 2 (Claim 5)
…"bits In groups"… should read --…"bits in groups"…--

Signed and Sealed this

Twenty-sixth Day of August, 2008

JON W. DUDAS
*Director of the United States Patent and Trademark Office*